(12) United States Patent
Kim et al.

(10) Patent No.: US 11,365,287 B2
(45) Date of Patent: Jun. 21, 2022

(54) PROCESS FOR PREPARING A POLY(AMIDE-IMIDE) FILM AND A POLY(AMIDE-IMIDE) FILM PREPARED BY THE SAME

(71) Applicant: SKC CO., LTD., Gyeonggi-do (KR)

(72) Inventors: Sunhwan Kim, Incheon (KR); Dae Seong Oh, Seoul (KR); Jin Woo Lee, Gyeonggi-do (KR); Dawoo Jeong, Gyeonggi-do (KR); Dong Jin Lim, Gyeonggi-do (KR); Kyung Won Choi, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 164 days.

(21) Appl. No.: 16/213,064

(22) Filed: Dec. 7, 2018

(65) Prior Publication Data

US 2019/0202990 A1 Jul. 4, 2019

(30) Foreign Application Priority Data

Dec. 28, 2017 (KR) .................. 10-2017-0182861

(51) Int. Cl.
*C08G 73/14* (2006.01)
*C08J 5/18* (2006.01)
(Continued)

(52) U.S. Cl.
CPC ............ *C08G 73/14* (2013.01); *B29C 41/003* (2013.01); *B29C 41/28* (2013.01); *B29C 41/46* (2013.01); *B29C 41/52* (2013.01); *C08G 73/1039* (2013.01); *C08G 73/1067* (2013.01); *C08J 5/18* (2013.01); *B29K 2077/00* (2013.01); *B29K 2105/0094* (2013.01); *C08J 2379/08* (2013.01)

(58) Field of Classification Search
CPC ................ C08G 73/1039; C08G 73/14; C08G 73/1067; C08G 73/10; B29C 41/003; B29C 41/28; B29C 41/46; B29C 41/52; C08J 5/18; C08J 2379/08; B29K 2077/00; B29K 2105/0094
See application file for complete search history.

(56) References Cited

U.S. PATENT DOCUMENTS

2007/0085234 A1* 4/2007 Boyle .................. C08J 5/18
264/216
2013/0203937 A1 8/2013 Cho et al.
(Continued)

FOREIGN PATENT DOCUMENTS

CN 102443264 A * 5/2012
CN 102443264 A 5/2012
(Continued)

OTHER PUBLICATIONS

English translation of CN-102443264-A by EPO (Year: 2012).*
(Continued)

*Primary Examiner* — Leith S Shafi
*Assistant Examiner* — Inja Song
(74) *Attorney, Agent, or Firm* — IP & T Group LLP (57) ABSTRACT

Embodiments relate to a process for preparing a poly(amide-imide) film and a poly(amide-imide) film prepared thereby. The process is capable of preparing a poly(amide-imide) film that is excellent in optical properties and mechanical properties.

11 Claims, 2 Drawing Sheets

(51) Int. Cl.

| | |
|---|---|
| *C08G 73/10* | (2006.01) |
| *B29C 41/00* | (2006.01) |
| *B29C 41/28* | (2006.01) |
| *B29C 41/46* | (2006.01) |
| *B29C 41/52* | (2006.01) |
| *B29K 77/00* | (2006.01) |
| *B29K 105/00* | (2006.01) |

(56) References Cited

U.S. PATENT DOCUMENTS

2018/0186936 A1* 7/2018 Ju .............................. C08J 5/18
2018/0355108 A1   12/2018 Jo et al.

FOREIGN PATENT DOCUMENTS

| CN | 107400236 A | 11/2017 | | |
|---|---|---|---|---|
| CN | 107400251 A | 11/2017 | | |
| EP | 3315534 | 5/2018 | | |
| JP | 59-204518 A | 11/1984 | | |
| JP | 09-227697 A | 9/1997 | | |
| JP | 09227697 A | * | 9/1997 | |
| JP | 2015-127111 A | 7/2015 | | |
| JP | 2017-067824 A | 4/2017 | | |
| JP | 2017-113938 A | 6/2017 | | |
| KR | 10-2016-0081829 | 7/2016 | | |
| KR | 10-2017-0076171 | 7/2017 | | |
| KR | 20170076171 A | * | 7/2017 | ............... C08J 5/18 |

OTHER PUBLICATIONS

English translation of KR-20170076171-A by EPO (Year: 2017).*
English translation of JP-09227697-A (Year: 1997).*
Office Action issued by Japan Patent Office dated Jan. 7, 2020.
Office Action issued by Chinese Patent Office dated Aug. 26, 2020.
Extended Search Report Issued by European Patent office dated May 22, 2019.
Office Action issued the Chinese Patent Office dated Mar. 8, 2021.
Office Action issued by Japanese Patent Office dated Mar. 2, 2021.

* cited by examiner

FIG. 1

FIG. 2 ical field

Embodiments relate to a process for preparing a poly(amide-imide) film. The process is capable of preparing a poly(amide-imide) film that is excellent in optical properties and mechanical properties.

BACKGROUND ART OF THE INVENTION

Since poly(amide-imide) (PAI) is excellent in resistance to friction, heat, and chemicals, it is employed in such applications as primary electrical insulation, coatings, adhesives, resins for extrusion, heat-resistant paintings, heat-resistant boards, heat-resistant adhesives, heat-resistant fibers, and heat-resistant films.

Poly(amide-imide) is used in various fields. For example, poly(amide-imide) is made in the form of a powder and used as a coating for a metal or a magnetic wire. It is mixed with other additives depending on the application thereof. In addition, poly(amide-imide) is used together with a fluoropolymer as a painter for decoration and corrosion prevention. It also plays a role of bonding a fluoropolymer to a metal substrate. In addition, poly(amide-imide) is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, poly(amide-imide) has been developed in the form of a film, which is less expensive and has excellent optical, mechanical, and thermal characteristics.

DISCLOSURE OF THE INVENTION

Problem to be Solved

An embodiment aims to provide an optimum process for preparing a poly(amide-imide) film that is colorless, transparent, and excellent in mechanical properties.

In addition, another embodiment aims to provide a poly(amide-imide) film prepared by the above preparation process and a use of the same.

Solution to the Problem

In an embodiment, there is provided a process for preparing a poly(amide-imide) film, which comprises simultaneously or sequentially mixing and reacting a diamine compound, a dianhydride compound, and a dicarbonyl compound in an organic solvent in a polymerization apparatus to prepare a polymer solution; transferring the polymer solution to a tank; purging the tank with an inert gas; casting the polymer solution in the tank onto a belt and then drying it to prepare a gel-sheet; thermally treating the gel-sheet while it is moved to prepare a cured film; cooling the cured film while it is moved; and winding the cooled cured film using a winder.

In another embodiment, there is provided a poly(amide-imide) film prepared by the above process for preparing a poly(amide-imide) film.

Advantageous Effects of the Invention

The process for preparing a poly(amide-imide) film is capable of securing a high process efficiency, lowering the defect rate of the poly(amide-imide) film produced thereby, and materializing excellent performance in terms of optical properties and mechanical properties.

DETAILED DESCRIPTION FOR CARRYING OUT THE INVENTION

Hereinafter, the present invention is described in detail with reference to embodiments. The embodiments are not limited to those disclosed below. Rather, they may be modified into various forms as long as the gist of the invention is not altered.

In order to clearly illustrate the various layers and regions in the drawings, some regions or some thicknesses are enlarged. In the drawings, for the convenience of explanation, the thicknesses of some layers and regions are exaggerated. Same reference numerals refer to the same elements throughout the specification.

In this specification, when a part is referred to as "comprising" an element, it is to be understood that the part may comprise other elements as well, unless otherwise indicated.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

An embodiment provides a process for preparing a poly(amide-imide) film.

Figure 1:
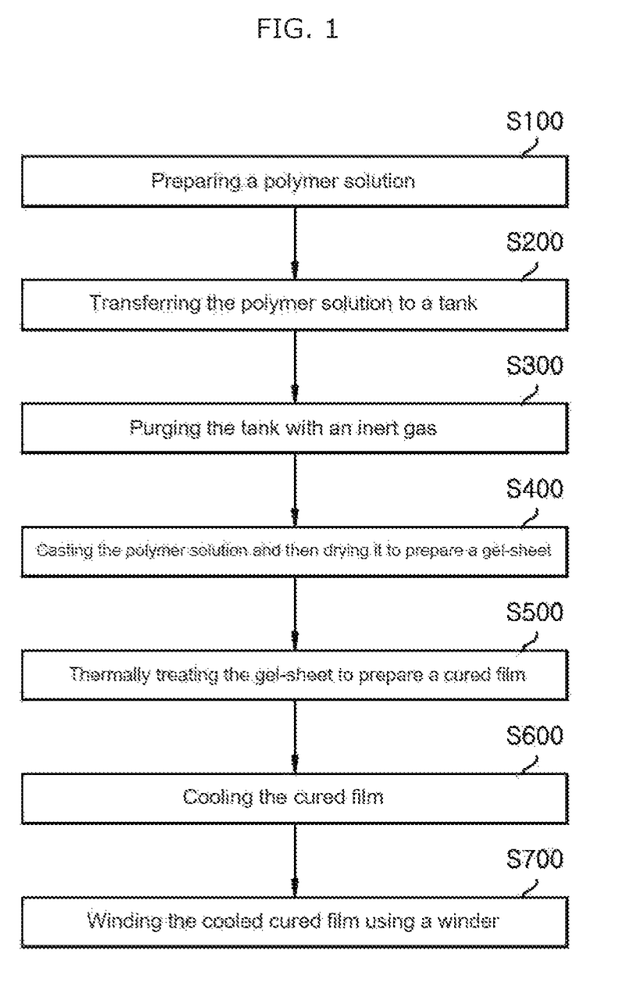
FIG. 1 is a schematic flow diagram of a process for preparing a poly(amide-imide) film according to an embodiment.

FIG. 1 is a schematic flow diagram of a process for preparing a poly(amide-imide) film according to an embodiment.

Referring to FIG. 1, the process for preparing a poly(amide-imide) film comprises simultaneously or sequentially mixing and reacting a diamine compound, a dianhydride compound, and a dicarbonyl compound in an organic solvent in a polymerization apparatus to prepare a polymer solution (S100); transferring the polymer solution to a tank (S200); purging the tank with an inert gas (S300); casting the polymer solution in the tank onto a belt and then drying it to prepare a gel-sheet (S400); thermally treating the gel-sheet while it is moved to prepare a cured film (S500); cooling the cured film while it is moved (S600); and winding the cooled cured film using a winder (S700).

The poly(amide-imide) film is a film mainly composed of a poly(amide-imide) resin. The poly(amide-imide) resin is a resin that comprises, as a structural unit, an amide repeat unit and an imide repeat unit at a predetermined molar ratio.

In the process for preparing a poly(amide-imide) film, a polymer solution for preparing the poly(amide-imide) resin is prepared by simultaneously or sequentially mixing and reacting a diamine compound, a dianhydride compound, and a dicarbonyl compound in an organic solvent in a polymerization apparatus (S100).

In an embodiment, the polymer solution may be prepared by simultaneously mixing and reacting the diamine compound, the dianhydride compound, and the dicarbonyl compound in an organic solvent.

In another embodiment, the step of preparing the polymer solution may comprise first mixing and reacting the diamine compound and the dianhydride compound to produce a polyamic acid (PAA) solution; and second mixing and reacting the polyamic acid (PAA) solution and the dicarbonyl compound to form an amide bond and an imide bond at the same time. The polyamic acid solution is a solution that comprises a polyamic acid.

In still another embodiment, the step of preparing the polymer solution may comprise first mixing and reacting the diamine compound and the dianhydride compound to produce a polyamic acid (PAA) solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound to produce a polyamide (PA) solution; and second mixing and reacting the PA solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

Alternatively, the polymer comprised in the polymer solution comprises an imide repeat unit derived from the polymerization of the diamine compound and the dianhydride compound and an amide repeat unit derived from the polymerization of the diamine compound and the dicarbonyl compound.

In an embodiment, the step of preparing the polymer solution may further comprise introducing a catalyst.

The catalyst may include, for example, beta picoline or acetic anhydride, but it is not limited thereto. The further addition of the catalyst may expedite the reaction rate and enhance the chemical bonding force between the repeat units or that within the repeat units.

In an embodiment, the step of preparing the polymer solution may further comprise adjusting the viscosity of the polymer solution.

Specifically, the step of preparing the polymer solution may comprise (a) simultaneously or sequentially mixing and reacting a diamine compound, a dianhydride compound, and a dicarbonyl compound in an organic solvent to prepare a first polymer solution; (b) measuring the viscosity of the first polymer solution and evaluating whether the target viscosity is reached; and (c) if the viscosity of the first polymer solution does not reach the target viscosity, further adding the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In another embodiment, the content of solids contained in the polymer solution may be 10% by weight to 20% by weight. Specifically, the content of solids contained in the second polymer solution may be 12% by weight to 18% by weight, but it is not limited thereto.

If the content of solids contained in the polymer solution is within the above range, a poly(amide-imide) film can be effectively produced in the extrusion and casting steps. In addition, the poly(amide-imide) film thus prepared may have mechanical properties in terms of an improved modulus and the like and optical properties in terms of a low yellow index and the like.

In an embodiment, the step of preparing the polymer solution may further comprise adjusting the pH of the polymer solution. In this step, the pH of the polymer solution may be adjusted to 4 to 7 or 4.5 to 7.

The pH of the polymer solution may be adjusted by adding a pH adjusting agent. The pH adjusting agent is not particularly limited and may include, for example, amine compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

The step of preparing the polymer solution may further comprise purging the tank with an inert gas. The step of purging the tank with an inert gas may remove moisture, reduce impurities, increase the reaction yield, and impart excellent surface appearance and mechanical properties to the film finally produced.

In such event, the inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The molar ratio of the dianhydride compound to the dicarbonyl compound used to prepare the polymer solution may be 20:80 to 80:20, for example, 20:80 to 50:50. If the dianhydride compound and the dicarbonyl compound are employed in the above molar ratio, it is advantageous to achieve the desired mechanical and optical properties of the poly(amide-imide) film prepared from the polymer solution.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

[Formula 1]

In the above Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, E may be the same as, or different from, each other.

(E)$_e$ in the above Formula 1 may be selected from the groups represented by the following Formulae 1-1a to 1-14a.

1-1a

1-2a

1-3a

1-4a

1-5a

1-6a

1-7a

1-8a

1-9a

1-10a 1-11a 1-12a 1-13a

*—(CH$_2$)$_n$—*     1-14a (n is selected from integers of 1 to 12)

Specifically, (E)$_e$ in the above Formula 1 may be selected from the groups represented by the following Formulae 1-1b to 1-13b, but it is not limited thereto.

1-1b 1-2b 1-3b 1-4b

-continued 1-5b 1-6b 1-7b 1-8b 1-9b 1-10b 1-11b 1-12b

1-13b

More specifically, $(E)_e$ in the above Formula 1 may be the group represented by the above Formula 1-6b.

In an embodiment, the dianhydride compound may comprise a compound having a fluorine-containing substituent. Alternatively, the dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

TFDB

The dianhydride compound is a compound that has a low birefringence value, so that it can contribute to enhancements in the optical properties such as transmittance of the poly(amide-imide) film.

The dianhydride compound is not particularly limited, but it may be, for example, an aromatic dianhydride compound that contains an aromatic structure. For example, the aromatic dianhydride compound may be a compound represented by the following Formula 2.

[Formula 2]

In the above Formula 2,

G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

2-1a

2-2a

-continued 2-3a

2-4a 2-5a 2-6a 2-7a 2-8a

2-9a

For example, G in the above Formula 2 may be the group represented by the above Formula 2-8a.

In an embodiment, the dianhydride compound may comprise a compound having a fluorine-containing substituent. Alternatively, the dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the aromatic dianhydride compound may comprise 2,2'-bis-(3,4-dicarboxyphenyl) hexafluoropropane dianhydride (6-FDA) represented by the following formula, but it is not limited thereto.

6-FDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

In the above Formula A, E, G, and e are as described above.

For example, the polyimide may comprise a repeat unit represented by the following Formula A-1, but it is not limited thereto.

[Formula A-1]

In the above Formula A-1, n is an integer of 1 to 400.

The dicarbonyl compound is not particularly limited, but it may be, for example, a compound represented by the following Formula 3.

[Formula 3]

In the above Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, J may be the same as, or different from, each other.

X is a halogen atom. Specifically, X may be F, Cl, Br, I, or the like. More specifically, X may be Cl, but it is not limited thereto.

(J)$_j$ in the above Formula 3 may be selected from the groups represented by the following Formulae 3-1a to 3-14a, but it is not limited thereto.

*—(CH$_2$)$_n$—*

(n is selected from integers of 1 to 12)

Specifically, (J)$_j$ in the above Formula 3 may be selected from the groups represented by the following Formulae 3-1b to 3-8b, but it is not limited thereto.

More specifically, (J)$_j$ in the above Formula 3 may be the group represented by the above Formula 3-2b or 3-3b.

In an embodiment, a mixture of at least two kinds of dicarbonyl compounds different from each other may be used as the dicarbonyl compound. If two or more dicarbonyl compounds are used, at least two dicarbonyl compound in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to enhancements in the mechanical properties such as surface hardness and tensile strength of the poly (amide-imide) film thus produced.

The dicarbonyl compound may comprise terephthaloyl chloride (TPC), 1,1'-biphenyl-4,4'-dicarbonyl dichloride (BPDC), as represented by the following formulae, or a combination thereof. But it is not limited thereto.

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, the poly(amide-imide) film thus produced may have high oxidation resistance.

The diamine compound and the dicarbonyl compound may be polymerized to form a repeat unit represented by the following Formula B.

[Formula B]

In the above Formula B, E, J, e, and j are as described above.

For example, the diamine compound and the dicarbonyl compound may be polymerized to form amide repeat units represented by the following Formulae B-1 and B-2.

[Formula B-1]

In the above Formula B-1, x is an integer of 1 to 400.

[Formula B-2]

In the above Formula B-2, y is an integer of 1 to 400.

In another embodiment, the polymer solution may comprise a poly(amide-imide) polymer formed by polymerizing a diamine compound, a dianhydride compound, and a dicarbonyl compound. In such event, the diamine compound may comprise one kind of diamine compound, the dianhydride compound may comprise one kind of dianhydride compound, and the dicarbonyl compound may comprise two kinds of dicarbonyl compound.

Alternatively, the diamine compound may be composed of one kind of diamine compound, the dianhydride compound may be composed of one kind of dianhydride compound, and the dicarbonyl compound may be composed of two kinds of dicarbonyl compound.

As described above, the poly(amide-imide) resin, which is a main component of the poly(amide-imide) film, is a resin that comprises, as a structural unit, an amide repeat unit and an imide repeat unit at a predetermined molar ratio.

It is possible to produce a poly(amide-imide) film whose optical characteristics, mechanical properties, and flexibility are improved in a well-balanced manner without a complicated process by properly controlling the content of the imide repeat unit and that of the amide repeat unit. In addition, it is possible to provide a poly(amide-imide) film whose optical characteristics, mechanical properties, and flexibility are improved in a well-balanced manner without such steps as precipitation, filtration, drying, and redissolution as adopted in the prior art. The content of the imide repeat unit and that of the amide repeat unit may be controlled by the amounts of the aromatic dianhydride and the dicarbonyl compound, respectively.

The molar ratio of the imide repeat unit to the amide repeat unit in the poly(amide-imide) resin may be 20:80 to 80:20, for example, 20:80 to 50:50. In such event, the imide repeat unit may be a repeat unit represented by the above Formula A, and the amide repeat unit may be a repeat unit represented by the above Formula B.

If the molar ratio of the poly(amide-imide) resin satisfies the above range, it is easy to control the viscosity of the polymer solution by using the monomers as described above for preparing the same. As a result, it is easy to produce a uniform film without defects on the surface thereof from the gel-sheet and the cured film.

The organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. Specifically, in an embodiment, the organic solvent employed in the polymerization solution may be dimethylacetamide (DMAc), but it is not limited thereto.

Next, after the step of preparing the polymer solution, the polymer solution is transferred to a tank (S200).

Figure 2:
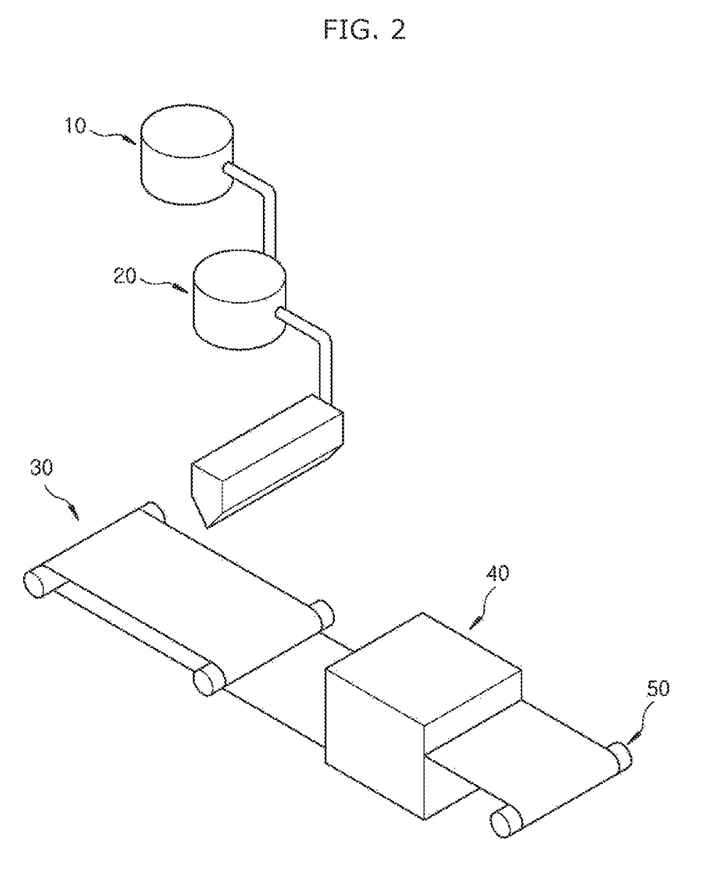
FIG. 2 schematically illustrates a process facility for preparing a poly(amide-imide) film according to an embodiment.

FIG. 2 schematically illustrates a process facility for preparing a poly(amide-imide) film according to an embodiment. Referring to FIG. 2, the polymer solution as described above is prepared in a polymerization apparatus (10), and the polymer solution thus produced is transferred to, and stored, in a tank (20).

Here, once the polymer solution is prepared, the step of transferring the polymer solution to the tank is carried out without any additional steps. Specifically, the polymer solution prepared in the polymerization apparatus is transferred to, and stored in, the tank without any separate precipitation and redissolution steps in order to remove impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 15° C., −20° C. to 10° C., −20° C. to 5° C., or −20° C. to 0° C., but it is not limited thereto.

If the temperature of the tank (20) is controlled to the above range, it is possible to prevent the polymer solution from deteriorating during storage, and it is possible to lower the moisture content to thereby prevent defects of the film produced therefrom.

The process for preparing a poly(amide-imide) film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a poly(amide-imide) film may further comprise purging the polymer solution transferred to the tank (20) with an inert gas (S300).

Specifically, the purging is carried out by purging the tank with an inert gas at an internal pressure of 1 atm to 2 atm. The nitrogen purging under these conditions may remove moisture in the polymer solution, reduce impurities to thereby increase the reaction yield, and achieve excellent optical properties such as haze and mechanical properties.

The step of vacuum degassing and the step of purging the tank with nitrogen gas are performed in a separate process, respectively.

For example, the step of vacuum degassing may be carried out, followed by the step of purging the tank with nitrogen gas, but it is not limited thereto.

The step of vacuum degassing and/or the step of purging the tank with nitrogen gas may improve the physical properties of the surface of the poly(amide-imide) film thus produced.

Thereafter, the process may further comprise storing the polymer solution in the tank (20) for 12 hours to 360 hours. Here, the temperature inside the tank may be kept at −20° C. to 20° C.

The process for preparing a poly(amide-imide) film may further comprise casting the polymer solution in the tank and then drying it to prepare a gel-sheet (S400).

The polymer solution may be cast onto a casting body such as a casting roll or a casting belt.

Referring to FIG. 2, in an embodiment, the polymer solution may be applied onto a casting belt (30) as a casting body, and it is dried while it is moved to be made into a sheet in the form of a gel.

When the polymer solution is injected onto the belt (30), the injection amount may be 300 g/min to 700 g/min. If the injection amount of the polymer solution satisfies the above range, the gel-sheet can be uniformly formed to an appropriate thickness.

In addition, the casting thickness of the polymer solution may be 200 μm to 700 μm. If the polymer solution is cast to a thickness within the above range, the final film produced after the drying and thermal treatment may have an appropriate and uniform thickness.

The polymer solution is cast and then dried at a temperature of 60° C. to 150° C. for 5 minutes to 60 minutes to prepare a gel-sheet. The solvent of the polymer solution is partially or totally volatilized during the drying to prepare the gel-sheet.

As described above, the viscosity of the polymer solution at room temperature may be 100,000 cps to 500,000 cps, for example, 100,000 cps to 400,000 cps, 100,000 cps to 350,000 cps, 100,000 cps to 300,000 cps, or 150,000 cps to 350,000 cps. If the viscosity satisfies the above range, the polymer solution can be cast to a uniform thickness without defects onto a belt.

The process for preparing a poly(amide-imide) film comprises thermally treating the gel-sheet while it is moved to prepare a cured film (S500).

Referring to FIG. 2, the thermal treatment of the gel-sheet can be carried out by passing it through a thermosetting device (40).

The thermal treatment of the gel-sheet may be carried out in a temperature range of 80° C. to 500° C. at a temperature elevation rate of 2° C./min to 80° C./min for 5 minutes to 40 minutes. Specifically, the thermal treatment of the gel-sheet may be carried out in a temperature range of 80° C. to 470° C. at a temperature elevation rate of 10° C./min to 80° C./min for 5 minutes to 30 minutes.

In such event, the initial temperature of the thermal treatment of the gel-sheet may be 80° C. or higher, and the maximum temperature in the thermal treatment may be 300° C. to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

That is, referring to FIG. 2, the inlet temperature of the thermosetting device (40) may be the initial temperature of the thermal treatment, and the temperature of a certain region inside the thermosetting device (40) may be the maximum temperature in the thermal treatment.

The thermal treatment under these conditions may cure the gel-sheet to have appropriate surface hardness and modulus and secure high light transmittance and low haze of the cured film at the same time.

The process for preparing a poly(amide-imide) film comprises cooling the cured film while it is moved (S600).

Referring to FIG. 2, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering steps.

If the step of cooling the cured film is carried in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a poly(amide-imide) film comprises winding the cooled cured film using a winder (S700).

Referring to FIG. 2, the cooled cured film may be wound by using a roll-shaped winder (50).

In such event, the ratio of the moving speed of the gel-sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.10 to 1:1.05, but it is not limited thereto.

If the ratio of the moving speeds is outside the above range, the mechanical properties of the cured film may be impaired, and the flexibility and elastic properties may be deteriorated.

Specifically, the moving speed of the gel-sheet on the belt at the time of drying may be 0.1 m/min to 15 m/min, for example, 0.5 m/min to 10 m/min.

In the process for preparing a poly(amide-imide) film, the thickness variation (%) according to the following Equation 1 may be 3% to 30%, for example, 5% to 20%.

$$\text{Thickness variation (\%)}=(M1-M2)/M2\times100 \quad \text{[Equation 1]}$$

In the above Equation 1, M1 is the thickness (μm) of the gel-sheet, and M2 is the thickness (μm) of the cooled cured film at the time of winding.

The poly(amide-imide) film produced according to the above-described preparation process has high oxidation resistance and can secure excellent optical properties such as high light transmittance, low haze, and low yellow index (YI). Further, it is possible to achieve long-term stable mechanical properties on a substrate that requires flexibility in terms of modulus, elongation, tensile characteristics, and elastic restoring force.

In addition, in the conventional process for preparing a poly(amide-imide) film, such byproducts as hydrochloric acid (HCl) are generated upon the polymerization reaction. After the separate precipitation, filtration, and drying steps to remove such byproducts, the resultant is dissolved again in a solvent to prepare a composition for the formation of a film. However, when such precipitation, filtration, drying, and redissolution steps are carried out, there is a problem that the yield is remarkably lowered. In contrast, in the preparation process according to an embodiment, the polymer solution is not ought to be subjected to the separate precipitation, filtration, drying, and redissolution steps. Since the polymer solution produced in the polymerization step can be directly applied to the casting step, the yield can be remarkably enhanced.

In addition, in the conventional process for preparing a poly(amide-imide) film, a step of purging with nitrogen gas is adopted in the thermal treatment for the formation of a film in order to ensure transparency of the film and prevent yellowing thereof. In contrast, in the preparation process according to an embodiment, it is possible to achieve excellent optical properties even though the nitrogen purging is not carried out in the film formation and thermal treatment steps. Thus, it is possible to eliminate the possibility that impurities are adulterated in the preparation process or that other physical properties than the optical properties may be impaired.

In another embodiment, there is provided a poly(amide-imide) film prepared by the above process for preparing a poly(amide-imide) film.

The poly(amide-imide) film prepared by the preparation process as described above is excellent in optical properties and mechanical properties. The poly(amide-imide) film may be applicable to various uses that require flexibility and transparency. For example, the poly(amide-imide) film may be applied to solar cells, displays, semiconductor devices, sensors, and the like.

The poly(amide-imide) film may have a total light transmittance of 80% or more. Specifically, the total light transmittance of the poly(amide-imide) film may be 80% to 99%. For example, it may be 85% to 99% or 88% to 99%.

The poly(amide-imide) film may have a haze of 3% or less. For example, the haze may be 2% or less, or 1% or less.

The poly(amide-imide) film may have a modulus in the MD direction of 5 GPa to 10 GPa when measured at room temperature. For example, the modulus may be 6 GPa to 10 GPa or 7 GPa to 10 GPa. In addition, the modulus in the TD direction may be 5 GPa to 10 GPa or 6 GPa to 10 GPa.

When the poly(amide-imide) film is perforated at a rate of 10 mm/min using a 2.5 mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The poly(amide-imide) film has a compressive strength is 0.4 kgf/μm or more. Specifically, the compressive strength may be 0.45 kgf/μm or more, or 0.46 kgf/μm or more, but it is not limited thereto.

The poly(amide-imide) film has a yellow index of 5 or less. Specifically, the yellow index may be 3 or less, 2.9 or less, 2.7 or less, 2.5 or less, 2.3 or less, 2.2 or less, or 2.1 or less, but it is not limited thereto.

The poly(amide-imide) film has a surface hardness of HB or more. Specifically, the surface hardness may be H or more, or 2H or more, but it is not limited thereto.

The poly(amide-imide) film has a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The poly(amide-imide) film has an elongation of 15% or more. Specifically, the elongation may be 16% or more, 17% or more, or 17.5% or more, but it is not limited thereto.

The various characteristics of the poly(amide-imide) film as described above may be combined.

The physical properties of the poly(amide-imide) film as described above are based on a thickness of 40 μm to 60 μm. For example, the physical properties of the poly(amide-imide) film are based on a thickness of 50 μm. In addition, the "MD direction" refers to the direction in which the belt moves during the preparation of the film, and the "TD direction" refers to the direction perpendicular to the MD direction.

The properties of the poly(amide-imide) film as described above are the results materialized by combinations of the chemical and physical properties of the components, which constitute the poly(amide-imide) film, along with the conditions in each step of the process for preparing the poly (amide-imide) film as described above.

Hereinafter, the above description will be described in detail by referring to Examples. But the following Examples are intended to illustrate the present invention, and the scope of the Examples is not limited thereto only.

EXAMPLE

For Examples 1 to 6 and Comparative Example 1, respective raw material components were prepared according to the composition as shown in Table 1.

TABLE 1

| Molar ratio | | | |
| --- | --- | --- | --- |
| Diamine compound | Dianhydride compound | Dicarbonyl compound | |
| TFDB | 6FDA | TPC | BPDC |
| 100 | 30 | 30 | 40 |

Example 1

A 1,000-liter polymerization apparatus equipped with a temperature-controllable double jacket was charged with dimethyl acetamide (DMAc) as an organic solvent under a nitrogen atmosphere at 20° C. Then, 2,2'-bis(trifluoromethyl)-4,4'-diaminobiphenyl (TFDB) as an aromatic diamine was slowly added thereto and dissolved.

Subsequently, while 2,2'-bis(3,4-dicarboxyphenyl) hexafluoropropane dianhydride (6-FDA) as an aromatic dianhydride was slowly added thereto, the mixture was stirred for 1 hour.

Then, 1,1'-biphenyl-4,4'-dicarbonyldichloride (BPDC) as a first dicarbonyl compound was added, followed by stirring the mixture for 1 hour. And terephthaloyl chloride (TPC) as a second dicarbonyl compound was added, followed by stirring the mixture for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 1 ml of the TPC solution was added to the first polymer solution, followed by stirring the mixture for 30 minutes. This procedure was repeated until the viscosity became 200,000 cps, thereby preparing a second polymer solution.

The second polymer solution was transferred to a tank and stored at −10° C. The tank was degassed for 1.5 hours, so that the pressure in the tank was 0.3 bar. Then, the tank was purged with a nitrogen gas at an internal pressure of 1.5 atm. Upon the purging, the second polymer solution was stored in the tank for 30 hours.

Subsequently, the second polymer solution was cast and then dried with hot air at 80° C. for 30 minutes, thereby producing a gel-sheet. Then, the gel-sheet was subjected to thermal treatment in a temperature range of 80° C. to 500° C. at a temperature elevation rate of 2° C./min to 80° C./min for 30 minutes while it was moved. Thereafter, a first temperature lowering step was carried out by reducing the temperature at a rate of 800° C./min, followed by a second temperature lowering step by reducing the temperature at a rate of 100° C./min, thereby obtaining a poly(amide-imide) film. The film was wound using a winder. In such event, the moving speed of the gel-sheet on the belt at the time of drying was 1 m/s. The speed of the winder was controlled such that the ratio of the moving speed of the gel-sheet on the belt at the time of drying to the moving speed of the film at the time of winding was within the range of 1:1.01 to 1:1.10.

Example 2

A film was prepared in the same manner, except that the second polymer solution prepared was transferred to, and stored in, a tank maintained at 0° C.

Example 3

A film was prepared in the same manner, except that the second polymer solution prepared was transferred to, and stored in, a tank maintained at 30° C.

Example 4

A film was prepared in the same manner as in Example 1, except that "the step of storing the second polymer solution in the tank for 30 hours" was not carried out after the purging of the second polymer solution.

Example 5

A film was prepared in the same manner as in Example 1, except that "a step of degassing for 5 hours, so that the pressure in the tank was 0.3 bar" was carried out instead of "the step of degassing for 1.5 hours, so that the pressure in the tank was 0.3 bar."

Example 6

A film was prepared in the same manner as in Example 1, except that "the step of degassing for 1.5 hours, so that the pressure in the tank was 0.3 bar" was not carried out after the purging of the second polymer solution.

Comparative Example 1

A film was prepared in the same manner as in Example 1, except that "the step of purging the tank with a nitrogen gas" was not carried out after the transferring of the second polymer solution to the tank.

Evaluation Example

The films according to Examples 1 to 6 and Comparative Example 1 were each measured and evaluated for the following properties.

Evaluation Example 1: Measurement of Film Thickness

Thickness was measured at 5 points in the width direction using a digital micrometer 547-401 manufactured by Mitutoyo Corporation. Their average value was adopted as the thickness.

Evaluation Example 2: Measurement of Light Transmittance

The transmittance at 550 nm was measured using a haze meter NDH-5000W manufactured by Nippon Denshoku Kogyo.

Evaluation Example 3: Measurement of Haze

The haze was measured using a haze meter NDH-5000W manufactured by Nippon Denshoku Kogyo.

Evaluation Example 4: Measurement of Yellow Index

The yellow Index (YI) was measured with a spectrophotometer (UltraScan PRO, Hunter Associates Laboratory) using a CIE colorimetric system.

Evaluation Example 5: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain in the stress-strain curve was taken as the modulus (GPa).

Evaluation Example 6: Measurement of Elongation

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The maximum ratio of elongation at the time of fracture in the stress-strain curve was defined as the elongation (%).

Evaluation Example 7: Measurement of Tensile Strength

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The maximum power exerted at the time of fracture in the stress-strain curve was defined as the tensile strength ($kgf/mm^2$).

TABLE 2

|  | Ex. 1 | Ex. 2 | Ex. 3 | Ex. 4 | Ex. 5 | Ex. 6 | C. Ex. 1 |
|---|---|---|---|---|---|---|---|
| Thickness (μm) | 50 | 50 | 50 | 50 | 50 | 50 | 50 |
| Light transmittance (%) | 89.8 | 89.7 | 89.7 | 88.9 | 89.7 | 88.9 | 88.7 |
| Haze (%) | 0.53 | 0.55 | 0.58 | 0.86 | 0.56 | 1.25 | 1.04 |
| Yellow index (YI) | 2.56 | 2.59 | 2.62 | 3.23 | 2.60 | 2.78 | 3.17 |
| Modulus (GPa) | 6.10 | 6.08 | 6.02 | 5.36 | 5.23 | 4.36 | 5.15 |
| Elongation (%) | 11.53 | 11.72 | 11.62 | 10.42 | 8.54 | 3.22 | 8.29 |
| Tensile strength ($kgf/mm^2$) | 19.61 | 19.60 | 19.60 | 18.51 | 18.17 | 15.64 | 16.60 |

As can be seen from the above Table 2, the preparation processes of Examples 1 to 6 were capable of producing poly(amide-imide) films that are excellent in optical properties and mechanical properties, as compared with the preparation process of Comparative Example 1.

DESCRIPTION OF THE NUMERALS

10: polymerization apparatus
20: tank
30: belt
40: thermosetting device
50: winder

The invention claimed is:

1. A process for preparing a poly(amide-imide) film, which comprises:
preparing a polymer solution;
transferring the polymer solution to a tank;
carrying out vacuum degassing after the polymer solution is transferred to the tank for 30 minutes to 3 hours, and the internal pressure of the tank reaches to 0.1 to 0.7 bar;
purging the tank with an inert gas;
storing the polymer solution in the tank for 12 hours to 360 hours after the purging of the tank;
casting the polymer solution in the tank onto a belt and then drying it to prepare a gel-sheet;
thermally treating the gel-sheet while it is moved to prepare a cured film;
cooling the cured film while it is moved; and
winding the cooled cured film using a winder,
wherein the tank has an internal temperature of from −20° C. to 20° C.,
wherein the step of preparing the polymer solution comprises
(a) simultaneously or sequentially mixing and reacting a diamine compound, a dianhydride compound, and a dicarbonyl compound in an organic solvent in a polymerization apparatus to prepare a first polymer solution;
(b) measuring the viscosity of the first polymer solution and evaluating whether a target viscosity is reached;
(c) determining that the viscosity of the first polymer solution is less than the target viscosity, and adding more of the dicarbonyl compound to prepare a second polymer solution having the target viscosity, and
wherein the target viscosity is 100,000 cps to 300,000 cps at room temperature.

2. The process for preparing a poly(amide-imide) film of claim 1,
which further comprises the step of purging the tank with an inert gas in the step of preparing the polymer solution.

3. The process for preparing a poly(amide-imide) film of claim 1,
wherein, once the polymer solution is prepared, the step of transferring the polymer solution to the tank is carried out without any additional steps.

4. The process for preparing a poly(amide-imide) film of claim 1,
wherein the purging is carried out by purging the tank with the inert gas at an internal pressure of 1 atm to 2 atm.

5. The process for preparing a poly(amide-imide) film of claim 1,
wherein the polymer solution is cast and then dried at a temperature of 60° C. to 150° C. for 5 minutes to 60 minutes to prepare a gel-sheet.

6. The process for preparing a poly(amide-imide) film of claim 1,
wherein the thermal treatment is carried out for 5 to 40 minutes at a temperature in a temperature range of 80° C. to 500° C. and while the temperature is increasing from an initial temperature to a maximum temperature at a temperature elevation rate of 2° C./min to 80° C./min.

7. The process for preparing a poly(amide-imide) film of claim 6,
wherein the initial temperature of the thermal treatment of the gel-sheet is 80° C. or higher, and the maximum temperature in the thermal treatment is 300° C. to 500° C.

8. The process for preparing a poly(amide-imide) film of claim 1,
wherein the step of cooling the cured film while it is moved comprises
a first temperature lowering step of reducing the temperature at a rate of 100° C./min to 1,000° C./min, and
a second temperature lowering step of reducing the temperature at a rate of 40° C./min to 400° C./min;
the second temperature lowering step is performed after the first temperature lowering step; and
the temperature lowering rate of the first temperature lowering step is faster than the temperature lowering rate of the second temperature lowering step.

9. The process for preparing a poly(amide-imide) film of claim 1,
wherein the ratio of the moving speed of the gel-sheet on the belt at the time of drying to the moving speed of the cured film at the time of winding is 1:0.95 to 1:1.40.

10. The process for preparing a poly(amide-imide) film of claim 1, wherein the thickness variation (%) according to the following Equation 1 is 3% to 30%:

Thickness variation (%)=$(M1-M2)/M2 \times 100$     [Equation 1]

in the above Equation 1, M1 is the thickness (μm) of the gel-sheet, and M2 is the thickness (μm) of the cooled cured film at the time of winding.

11. A poly(amide-imide) film prepared by the preparation process of claim 1.

* * * * *